(No Model.)

A. L. SEELBACH.
GUY ROPE FASTENER.

No. 446,020. Patented Feb. 10, 1891.

Witnesses
L. C. Hills.
G. M. Copenhaver

Inventor
Arthur L. Seelbach,
per Chas. H. Fowler,
Attorney

UNITED STATES PATENT OFFICE.

ARTHUR L. SEELBACH, OF CLEVELAND, OHIO.

GUY-ROPE FASTENER.

SPECIFICATION forming part of Letters Patent No. 446,020, dated February 10, 1891.

Application filed September 10, 1890. Serial No. 364,564. (No model.)

*To all whom it may concern:*

Be it known that I, ARTHUR L. SEELBACH, a citizen of the United States, residing at Cleveland, in the county of Cuyahoga and State of Ohio, have invented certain new and useful Improvements in Guy-Rope Fasteners; and I do hereby declare that the following is a full, clear, and exact description of the same, reference being had to the annexed drawings, making a part of this specification, and to the letters of reference marked thereon.

Figure 1:
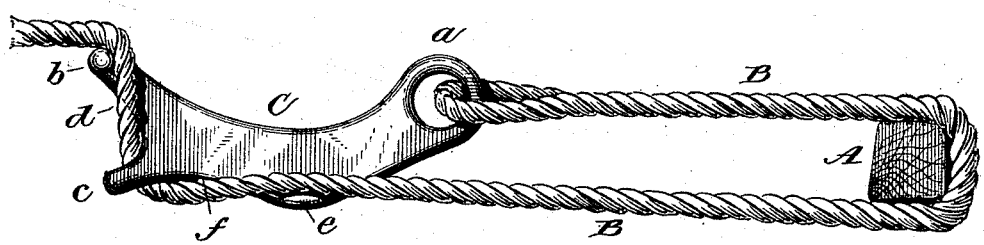
Figure 2:
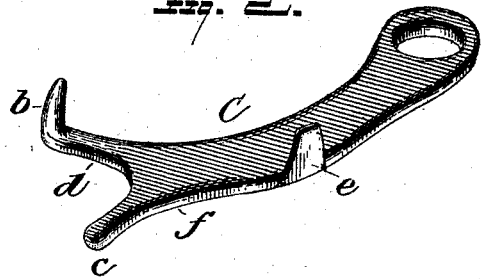

Figure 1 of the drawings is a view showing the application of my improved guy-rope fastener, and Fig. 2 a detail view in perspective of the fastener.

The present invention has for its object to provide a simple and effective means for fastening guy-ropes, whereby the putting up or taking down of tents or hammocks is greatly facilitated and all danger of the slipping of the rope when fastened to the stake or other object is wholly removed, or when left in a rain or heavy dew the shrinkage of the canvas or ropes will have no effect on the tent, or tear the canvas or pull up the stakes. It is the purpose of the invention to provide a fastener that will possess all the advantages necessary as a means for holding securely a guy-rope and the ropes used upon a vessel in the rigging or other places where such a fastener would be found useful. The invention consists, therefore, of a fastener constructed substantially as shown in the drawings, and hereinafter described and claimed.

In the accompanying drawings I have shown the manner of using the fastener in Fig. 1, the stake being represented at A and the rope at B, one end thereof being connected to the fastening device, as shown at C.

The fastening device C is of metal, and has an eye $a$ for securing the rope thereto, as shown, and its edges are rounded, so as to prevent any danger of cutting the rope when the rope is engaged with the fastener, as shown in Fig. 1 of the drawings. The fastening device C is curved or upon an arc of a circle, as shown, so that the upwardly-extending finger $b$ at its extremity will be on a line with the eye $a$, so that the strain of the rope will be on a direct line across the two ends of the device, thereby securing a much better hold on the fastener with less liability of the rope slipping. The device C has a laterally-extending finger $c$, which is horizontal, or upon substantially the same plane with the base of the device C, and between it and the finger $b$ is a curved bearing $d$ for the rope. The device C has a third finger $e$, which extends upwardly and is diagonally opposite the finger $b$, and between this finger and the finger $c$ is a bearing $f$ for the rope, thereby providing a perfect fastener, the relative arrangements of the fingers providing a perfect and absolutely secure fastening for the rope when in position shown in Fig. 1.

Having now fully described my invention, what I claim as new, and desire to secure by Letters Patent, is—

The fastening for guy-ropes, consisting of the device C, curved as shown, and provided at one end with the eye $a$ for attaching the end of rope thereto, and having the upwardly-extending fingers $b$ $e$ disposed diagonally opposite each other and the horizontal finger $c$ disposed between the same, and the bearings $d$ $f$ between the fingers, substantially as and for the purpose set forth.

In testimony that I claim the above I have hereunto subscribed my name in the presence of two witnesses.

ARTHUR L. SEELBACH.

Witnesses:
FRANCIS J. MEYER,
RUDOLPH LACK.